(12) United States Patent
Tsai

(10) Patent No.: US 11,038,448 B2
(45) Date of Patent: Jun. 15, 2021

(54) MOTOR DRIVING CIRCUIT AND METHOD THEREOF

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

(*) Notice: Subject to any disclaimer, the term of this patent is extended or adjusted under 35 U.S.C. 154(b) by 0 days.

(21) Appl. No.: 16/791,057

(22) Filed: Feb. 14, 2020

(65) Prior Publication Data
US 2021/0044227 A1 Feb. 11, 2021

(30) Foreign Application Priority Data
Aug. 7, 2019 (TW) .................................. 108128154

(51) Int. Cl.
| | |
|---|---|
| *H02P 6/00* | (2016.01) |
| *H02P 6/182* | (2016.01) |
| *H02P 7/03* | (2016.01) |
| *H02P 27/08* | (2006.01) |
| *H02P 6/04* | (2016.01) |
| *H02P 6/08* | (2016.01) |
| *H02P 6/28* | (2016.01) |

(52) U.S. Cl.
CPC ............... *H02P 6/182* (2013.01); *H02P 6/04* (2013.01); *H02P 6/085* (2013.01); *H02P 6/28* (2016.02); *H02P 7/03* (2016.02); *H02P 27/08* (2013.01); *H02P 2006/045* (2013.01)

(58) Field of Classification Search
CPC .... H02P 6/182; H02P 6/28; H02P 6/04; H02P 6/085; H02P 27/08; H02P 2006/045
See application file for complete search history.

(56) References Cited

U.S. PATENT DOCUMENTS 5,530,338 A * 6/1996 Beckwith .................. G05F 1/14
323/255

* cited by examiner

*Primary Examiner* — Karen Masih
(74) *Attorney, Agent, or Firm* — Li & Cai Intellectual Property (USA) Office

(57) ABSTRACT

A motor driving circuit includes a rotation speed request generator, a motor driving signal generating unit, an inverter circuit, a position detecting circuit, a current detecting module, a rotation speed signal lookup module, an automatic leading angle controller, and a modulation signal generating circuit. When the rotation speed request signal indicates that a rotation speed of a motor is adjusted to a current rotation speed, the rotation speed signal lookup module queries a lookup table and generates a leading angle indication signal for indicating a current leading angle as a adjusting angle, and the automatic leading angle controller generates a phase adjusting signal, and the modulation signal generation circuit roughly adjusts a modulation waveform with the adjusting phase. The modulation signal generating circuit performs a fine adjustment on the modulation waveforms according to a phase difference, thereby making the current zero-crossing point near the BEMF zero point.

10 Claims, 6 Drawing Sheets

MOTOR DRIVING CIRCUIT AND METHOD THEREOF

CROSS-REFERENCE TO RELATED PATENT APPLICATION

This application claims the benefit of priority to Taiwan Patent Application No. 108128154, filed on Aug. 7, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor driving circuit and method, and more particularly to a motor driving circuit and method for preventing a reverse current during a rapid variation in output period.

BACKGROUND OF THE DISCLOSURE

In a motor such as a brushless direct current (DC) motor that does not have a commutation mechanism formed by electrical brushes, it is necessary to switch a direction of current supplied to a coil in accordance with a position of a rotor. The driving method of the brushless DC motor can generally be divided into the following two methods, namely, one method uses position information of the rotor obtained from Hall elements, and the other method is a sensorless manner of estimating the position of the rotor according to a zero-crossing point of a back electromotive force (BEMF), that is, inducted voltage, generated in the coil without using Hall elements.

The existing DC motor driving methods can be divided into a six-step square wave driving method and a sine wave pulse width modulation (PWM) method, and the two different driving methods have advantages and disadvantages. The sine PWM driving method is similar to a method for driving an AC motor, which inputs a three-phase sinusoidal current at a stator end, and generates a set of rotating magnetic fields to drive the rotor to rotate. Smaller torque ripples can be obtained by using the sine wave PWM driving method to drive the brushless DC motor; however, a position sensor having a higher resolution is required to generate a correct sine wave signal. The six-step square wave driving method has low switching loss and does not require precise rotor position feedback, but torque ripples thereof can be larger.

Secondly, when controlling a rotation speed of the motor, the pulse width modulation technology is mainly used, that is, PWM signals are generated to control transistor switches, and a duty cycle of the PWM signals is proportional to an average voltage given to the motor, such that the rotation speed of the motor can be controlled. The PWM signal controls transistor switch in many different ways, such as controlling an upper bridge transistor switch and a lower bridge transistor switch in turn.

In the sensorless motor, it is necessary to determine the position of the rotor and switching timings of the driving signal by measuring the BEMF zero point of a phase voltage and a zero-crossing point of a phase current. During a measurement of the BEMF zero point of the phase circuit, the transmission of the output drive signal is usually stopped, and after waiting for a period of time for a current to completely flow through the coil, the BEMF zero point can then be detected. The sine wave driving signal of next cycle can be output in response to an appearance of the BEMF zero point. However, during the rapid switching variation of the rotation speed, the BEMF zero point may be misjudged when the phase current has not completely flowed out during the measurement.

In the existing motor drive circuit, although the driving voltage is output directly at a maximum leading angle when the rotation speed changes, such that the phase current zero point can appear earlier to avoid misjudgment, however, a duration of the phase current discontinuity may be too long, thereby causing noise.

Therefore, there is an urgent need in the art for a motor driving circuit and method that can achieve a leading angle adjustment mechanism for low switching noise.

SUMMARY OF THE DISCLOSURE

In response to the above-referenced technical inadequacies, the present disclosure provides a motor driving circuit and method capable of preventing noise generated when an output rotation speed is changed.

In one aspect, the present disclosure provides a motor driving circuit including a rotation speed request generator, a motor driving signal generating unit, an inverter circuit, a position detecting circuit, a current detecting module, a rotation speed signal lookup module, an automatic leading angle controller, and a modulation signal generating circuit. The rotation speed request generator is configured to receive an external rotation speed request signal and generate a rotation speed request signal for indicating a rotation speed of the motor. The motor driving signal generating unit is configured to receive the rotation speed request signal and a plurality of modulation waveforms, and generate a plurality of gate driving signals according to modulation characteristics of the modulation waveforms and the rotation speed request signal. The inverter circuit including a plurality of half bridge circuits is configured to be controlled by the plurality of gate driving signals to generate a plurality of motor drive signals for input to a plurality of phase circuits of the motor. The position detecting circuit is configured to receive a plurality of back electromotive force (BEMF) signals from the plurality of phase circuits and generate a position reference signal for indicating a back electromotive force (BEMF) zero point of the motor. The current detecting module is configured to receive the motor driving signals and generate a zero current signal for indicating current zero-crossing points of the phase circuits. The speed signal lookup table module is configured to store a lookup table, the lookup table defines correspondences between a plurality of rotation speeds and a plurality of leading angles, and the rotation speed signal lookup module is configured to, in response to the rotation speed request signal, query the lookup table according to the rotation speed request signal to generate a leading angle indication signal. The automatic leading angle controller receives the leading angle indication signal, the zero current signal and the position reference signal, and is configured to generate a phase adjusting signal for indicating an adjusting phase according to a leading angle indicated by the leading angle indication signal, a current zero point indicated by the zero current signal, and a rotation reference position indicated by the position reference signal. The modulation signal generating circuit is configured to receive the phase adjusting signal to generate the modulation waveforms, and further change phases of the modulation waveforms according to the adjusting phase indicated by the phase adjusting signal. In response to the rotation speed request signal indicating that the rotation speed is adjusted from a previous rotation speed to a current rotation speed, the rotation speed signal lookup module is configured to query the lookup table according to the current rotation speed and generate the leading angle indication signal for indicating a current lead angle, the automatic leading angle controller is configured to generate the phase adjusting signal by using the current lead angle as the adjusting phase, and the modulation signal generating circuit is configured to perform a rough adjustment on the modulation waveforms by using the adjusting phase. The automatic leading angle controller further receives the zero current signal and the position reference signal to generate another phase adjusting signal according to a phase difference between the current zero-crossing point and the BEMF zero point, the modulation signal generating circuit receives the another phase adjusting signal, and performs a fine adjustment on the modulation waveforms according to the phase difference, thereby making the current zero-crossing point of the phase circuits near the BEMF zero point.

In some embodiments, the motor driving signal generating unit includes a PWM generator and a gate driving circuit. The PWM generator is configured to receive the rotation speed request signal and generate a plurality of PWM signals, and the PWM generator is further configured to receive the modulation waveforms to generate the PWM signals according to the modulation characteristics of the modulation waveforms. The gate driving circuit is configured to receive the PWM signals and generate the gate driving signals.

In some embodiments, the leading angles are generated by driving the motor with the rotation speeds, respectively, and adjusting the plurality of leading angles to ensure that the current zero-crossing point occurs with a buffer phase difference being ahead of the BEMF zero point.

In some embodiments, the current detecting module includes a comparator including a first input, a second input, and an output. The first input is used to receive current of one of the phase circuits, the second input is used to receive a reference current, and the output is used to generate the zero current signal after the comparator performs an operation on the current and the reference current, and the zero current signal is used to indicate current zero-crossing points of the current.

In some embodiments, the automatic leading angle controller further receives the zero current signal and the position reference signal to subtract a predetermined phase difference from the phase difference between the current zero-crossing point and the BEMF zero point to generate the another phase adjusting signal for adjusting the phase difference between the current zero-crossing point and the BEMF zero point to the predetermined phase difference.

In one aspect, the present disclosure provides a motor driving method including the following steps: configuring a rotation speed request generator to receive an external rotation speed request signal and generate a rotation speed request signal for indicating a rotation speed of the motor; configuring a motor driving signal generating unit to receive the rotation speed request signal and a plurality of modulation waveforms, and generate a plurality of gate driving signals according to modulation characteristics of the modulation waveforms and the rotation speed request signal; configuring a plurality of half bridge circuits of an inverter circuit to be controlled by the plurality of gate driving signals to generate a plurality of motor drive signals for input to a plurality of phase circuits of the motor; configuring a position detecting circuit to receive a plurality of back electromotive force (BEMF) signals from the plurality of phase circuits and generate a position reference signal for indicating a back electromotive force (BEMF) zero point of the motor; configuring a current detecting module to receive the motor driving signals and generate a zero current signal for indicating current zero-crossing points of the phase circuits; configuring a speed signal lookup table module to store a lookup table, wherein the lookup table defines correspondences between a plurality of rotation speeds and a plurality of leading angles; configuring the rotation speed signal lookup module to, in response to the rotation speed request signal, query the lookup table according to the rotation speed request signal to generate a leading angle indication signal; configuring an automatic leading angle controller to receive the leading angle indication signal, the zero current signal and the position reference signal, and determine a phase adjusting signal for indicating an adjusting phase according to a leading angle indicated by the leading angle indication signal, a current zero point indicated by the zero current signal, and a rotation reference position indicated by the position reference signal; configuring a modulation signal generating circuit to receive the phase adjusting signal to generate the modulation waveforms, and further change phases of the modulation waveforms according to the adjusting phase indicated by the phase adjusting signal; configuring, in response to the rotation speed request signal indicating that the rotation speed is adjusted from a previous rotation speed to a current rotation speed, the rotation speed signal lookup module to query the lookup table according to the current rotation speed and generate the leading angle indication signal for indicating a current lead angle; configuring the automatic leading angle controller to generate the phase adjusting signal by using the current lead angle as the adjusting phase; configuring the modulation signal generating circuit to perform a rough adjustment on the modulation waveforms by using the adjusting phase; configuring the automatic leading angle controller to receive the zero current signal and the position reference signal to generate another phase adjusting signal according to a phase difference between the current zero-crossing point and the BEMF zero point; and configuring the modulation signal generating circuit to receive the another phase adjusting signal, and perform a fine adjustment on the modulation waveforms according to the phase difference, thereby making the current zero-crossing point of the phase circuits near the BEMF zero point.

In some embodiments, the motor driving method further includes: configuring a PWM generator of the motor driving signal generating unit to receive the rotation speed request signal to generate a plurality of PWM signals; configuring the PWM generator to receive the modulation waveforms to generate the PWM signals according to the modulation characteristics of the modulation waveforms; and configuring a gate driving circuit to receive the PWM signals and generate the gate driving signals.

In some embodiments, the motor driving method further includes: configuring the motor to be driven by the motor with the plurality of rotation speeds in the lookup table; and adjusting the plurality of leading angles to ensure that the current zero-crossing point occurring with a buffer phase difference ahead of the BEMF zero point, thereby obtaining the leading angles corresponding to the rotation speeds to establish the lookup table.

In some embodiments, the motor driving method further includes: configuring a first input of a comparator of the current detecting module to receive current of one of the phase circuits; configuring a second input of the comparator to receive a reference current; and configuring the comparator to perform an operation on the current and the reference current and generate the zero current signal at an output of the comparator, wherein the zero current signal is used for indicating current zero-crossing points of the current.

In some embodiments, the motor driving method further includes: configuring the automatic leading angle controller to receive the zero current signal and the position reference signal to subtract a predetermined phase difference from the phase difference between the current zero-crossing point and the BEMF zero point to generate the another phase adjusting signal. The another phase adjusting signal is used for adjusting the phase difference between the current zero-crossing point and the BEMF zero point to the predetermined phase difference.

Therefore, the motor driving circuit and method provided by the present disclosure can determine the lead angle by querying the lookup table when the switching speed is changed, and roughly adjust the modulation waveform by the lead angle to output a driving voltage in advance, so as to make the phase current zero point appear earlier, and then the phase difference between the phase current zero point and the back electromotive force zero point is detected to adjust the lead angle to be near a reasonable phase. Therefore, under a premise of satisfying the position detection of a sensorless motor, it is ensured that the phase current does not cause errors to occur in the BEMF zero point detection when the BEMF zero point is measured, while effectively reducing the current discontinuous region, thereby reducing the noise.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
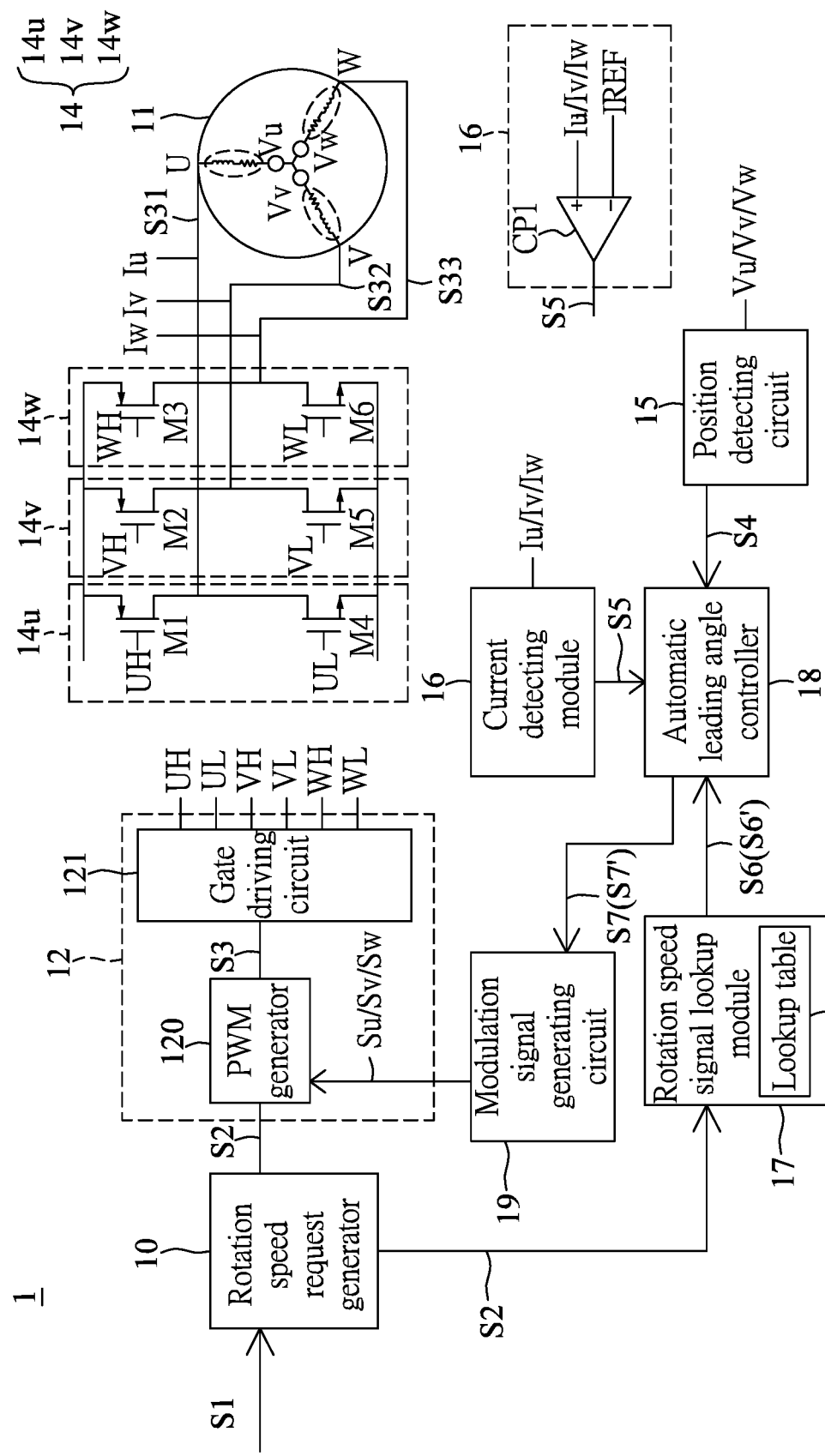
FIG. 1 is a circuit schematic diagram of a motor driving circuit of an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a circuit schematic diagram of a motor driving circuit of an embodiment of the present disclosure. Reference is made to FIG. 1, an embodiment of the present disclosure provides a motor driving circuit 1 for driving a motor 11, which includes a rotation speed request generator 10, a motor driving signal generating unit 12, an inverter circuit 14, a position detecting circuit 15, a current detecting module 16, a rotation speed signal lookup module 17, an automatic leading angle controller 18, and a modulation signal generating circuit 19.

The motor 11 includes three windings as shown in FIG. 1, such as phase circuits U, V, W, each of which is generally depicted as a corresponding equivalent circuit having an inductor in series with a resistor and a back electromotive force (BEMF) voltage source. For example, the phase circuit U is shown as including an inductor in series with a resistor and a voltage source of a BEMF signal Vu, the phase circuit V is shown as including an inductor in series with a resistor and a voltage source of a BEMF signal Vv, and the phase circuit W is shown as including an inductor in series with a resistor and a voltage source of a BEMF signal Vw.

The rotation speed request generator 10 is configured to receive an external rotation speed request signal S1 from the outside, and the external rotation speed request signal S1 may be one of various formats. Generally, the external rotation speed request signal S1 indicates a rotation speed of the motor 11 requested from the external of the motor drive circuit 1. When the rotation speed request generator 10 receives the external rotation speed request signal S1, a rotation speed request signal S2 can be generated correspondingly for instructing the motor 11 to operate at the required rotation speed.

The motor driving signal generating unit 12 is configured to receive the rotation speed request signal and a plurality of modulation waveforms Su, Sv and Sw, and generate a plurality of gate driving signals UH, UL, VH, VL, WH, WL according to modulation characteristics of the modulation waveforms Su, Sv and Sw and the rotation speed request signal S2. In the present embodiment, the motor drive signal generating unit 12 includes a PWM generator 120 and a gate driving circuit 121. The PWM generator 120 is configured to receive the rotation speed request signal S2 and generate a plurality of PWM signals S3, and the PWM generator 120 is further configured to receive the modulation waveforms Su, Sv and Sw to generate the PWM signals S3 according to the modulation characteristics of the modulation waveforms Su, Sv and Sw, and a maximum duty cycle of the PWM signals S3 is controlled by the rotation speed request signal S2.

The motor driving signal generating unit 12 further includes the gate driving circuit 121 configured to receive the PWM signals S3 to generate the gate driving signals UH, UL, VH, VL, WH, WL to control the inverter circuit 14.

The inverter circuit 14 includes a plurality of half bridge circuits 14$u$, 14$v$ and 14$w$, and the half bridge circuits 14$u$, 14$v$ and 14$w$ each include upper bridge switches M1, M2, M3 and lower bridge switches M4, M5, M6, which are controlled by the gate driving signals UH, UL, VH, VL, WH, WL to generate a plurality of motor driving signals S31, S32 and S33. The motor driving signals S31, S32 and S33 are respectively input to the phase circuits U, V, W of the motor 11, and the gate driving signals UH, UL, VH, VL, WH, and WL are used to control on or off states of the respective switching elements in the inverter circuit 14.

In general, the motor 11 has three windings, which are a U coil winding, a coil winding, and a W coil winding. When the upper bridge switch M1 and the lower bridge switch M5 are turned on, the current for driving the motor 11 operated flows from the power supply terminal, through the transistor M1, the U coil winding of the motor 11, the V coil winding, and then flows to the ground terminal through the transistor M5.

Generally, the currents for controlling a normal motor flows from the U coil winding to the V coil winding, the U coil winding to the W coil winding, and then changes the direction of the currents as flowing from the V coil winding to the W coil winding, the V coil winding to the U coil winding, and then V coil winding to the W coil winding. Next, other phase changes continuously control the flow direction of the current of U coil windings U, V coil winding V, the W coil winding W, thereby controlling the rotation direction of the motor. The phase change of the motor is described in the above embodiment, however, this is only one way of controlling motor phase changing, other phase changing methods of the motor will not be described herein.

The motor drive circuit 1 further includes the position detection circuit 15 configured to receive a plurality of BEMF signals Vu, Vv, and Vw from the phase circuits U, V, W. As can be seen from an equivalent circuit of the motor 11 of FIG. 1, the position detecting circuit 15 can receive the motor driving signals S31, S32 and S33, which include the BEMF signals Vu, Vv and Vw and can be directly observed when the phase circuits U, V, W are not driven and phase currents Iv, Iu, and Iw are zero. The position detecting circuit 15 can generate a position reference signal S4 for indicating the BEMF zero point of the motor 11, which can be further used to indicate a rotor position of the motor 11.

The current detecting module 16 can receive one of the motor driving signals S31, S32 and S33 and generate a zero current signal S5 for indicating the current zero-crossing point of the phase circuits U, V, W. In general, it is expected that the zero-crossing points of the BEMF signals Vu, Vv, and Vw will coincide or nearly coincide with the current zero points on the phase circuits U, V, W of the motor 11, which will cause the motor 11 to operate at the highest efficiency.

In some embodiments, the current detecting module 16 can include the comparator CP1 as shown in FIG. 1. A first input of the comparator CP1 can receive the phase current Iu, Iv or Iw, the second input of the comparator CP1 can receive a reference current IREF, such as a zero current, and the comparator CP1 further performs an operation on the phase current Iu, Iv or Iw and the reference current IREF to generate a zero current signal S5 for indicating a current zero-crossing point of the phase current Iu, Iv or Iw.

The motor 11 can be a sensorless motor, and it is necessary to determine the rotor position and switching timings of the driving signal by measuring the BEMF zero points of the phase circuits U, V, W and the zero crossing-point of the phase current Iu, Iv or Iw. During a measurement of the BEMF zero point of the phase circuit U, V, or W, the PWM signal S3 is usually stopped, and after waiting for a period of time until a current completely flows through the coil, and the BEMF zero point can then be detected. The sine wave driving signal of next cycle can be output in response to an appearance of the BEMF zero point. However, during the rapid switching variation of the rotation speed, the BEMF zero point may be misjudged when the phase currents Iv, Iu and Iw have not completely flowed out during the measurement.

Therefore, when the rotation speed changes, it is necessary to use a leading angle to output the PWM signal S3 in advance, so as to make the zero points of the phase currents Iv, Iu and Iw appear earlier to avoid misjudgment. However, if an excessive leading angle is used, a discontinuous duration of the phase current Iv, Iu or Iw may be too long, thereby resulting in noise.

Since the phase currents Iv, Iu, and Iw fall behind the modulation waveforms Su, Sv, and Sw by about 30 degrees, in order to make the zero points of the phase currents Iv, Iu, and Iw correspond to the zero-crossing points of the BEMF signals Vu, Vv, and Vw, the modulation waveforms Su, Sv and Sw must be output in advance. Furthermore, when measuring the zero points of the BEMF signals Vu, Vv, and Vw, errors may occur in the detected positions of the zero points of the BEMF signals Vu, Vv, and Vw if the phase currents Iv, Iu, and Iw are not zero.

Therefore, the motor driving circuit 1 of the present disclosure further includes a rotation speed signal lookup table module 17 for storing a lookup table 170 that defines correspondences between a plurality of rotation speeds and a plurality of leading angles. The rotation speed signal lookup module 17 is configured to, in response to the rotation speed request signal S2, query the lookup table 170 according to the rotation speed request signal S2 to generate a leading angle indication signal S6.

The plurality of leading angles and the plurality of rotation speeds are generated by driving the motor 11 with the rotation speeds, respectively, while adjusting the plurality of leading angles to ensure that the current zero-crossing points of the phase currents Iv, Iu and Iw occurring with a buffer phase difference ahead of the BEMF zero points of the BEMF signals Vu, Vv and Vw. Thus, when the predetermined leading angles are used, it is ensured that the phase currents Iv, Iu and Iw must be zero when measuring the zero positions of the BEMF signals Vu, Vv and Vw, thereby obtaining accurate zero positions of the BEMF signals Vu, Vv and Vw. Aside from that the rotation speed signal lookup module 17 queries the lookup table 170 according to a rotation speed corresponding to the rotation speed request signal S2 to generate a leading angle indication signal S6, the lookup table 170 can further define correspondences between voltages corresponding to the plurality of rotation speeds and the leading angles corresponding to the rotation speeds, so as to query the voltage of the rotation speed request signal S2. The speed signal lookup module 17 can be a database, a register, a memory, or other components having storage functions, and the present disclosure is not limited thereto.

In addition, the motor driving circuit 1 of the present disclosure further includes the automatic leading angle controller 18 that receives the leading angle indication signal S6, the zero current signal S5 and the position reference signal S4, the automatic leading angle controller 18 is configured to generate a phase adjusting signal S7 for indicating an adjusting phase according to a leading angle indicated by the leading angle indication signal S6, a current zero point indicated by the zero current signal S5, and a rotation reference position indicated by the position reference signal S4.

The modulation signal generating circuit 19 is configured to receive the phase adjusting signal S7 to generate the modulation waveforms Su, Sv, Sw, and further change phases of the modulation waveforms Su, Sv, Sw according to the adjusting phase indicated by the phase adjusting signal S7.

In response to the rotation speed request signal S2 indicating that the rotation speed is adjusted from a previous rotation speed to a current rotation speed, for example, from 20% rotation speed to 80% rotation speed, the rotation speed signal lookup module 17 is configured to query the lookup table 170 according to the current rotation speed, such as 80% rotation speed, and generate the leading angle indication signal S6' for indicating the current lead angle, the automatic leading angle controller 18 is configured to generate the phase adjusting signal S7 by using the current lead angle as the adjusting phase, and the modulation signal generating circuit 19 is configured to perform a rough adjustment on the modulation waveforms Su, Sv, and Sw by using the adjusting phase.

Next, the automatic lead angle controller 18 further receives the zero current signal S5 and the position reference signal S4 to generate another phase adjusting signal S7' based on phase differences between the current zero-crossing points of the phase currents Iv, Iu, and Iw and the BEMF zero-crossing points of the BEMF signals Vu, Vv, and Vw.

The modulation signal generating circuit 19 receives another phase adjusting signal S7', and performs a fine adjustment on the modulation waveforms Su, Sv, and Sw according to the phase differences, thereby making the current zero-crossing points of the phase circuits U, V, W near the BEMF zero points.

Figure 2:
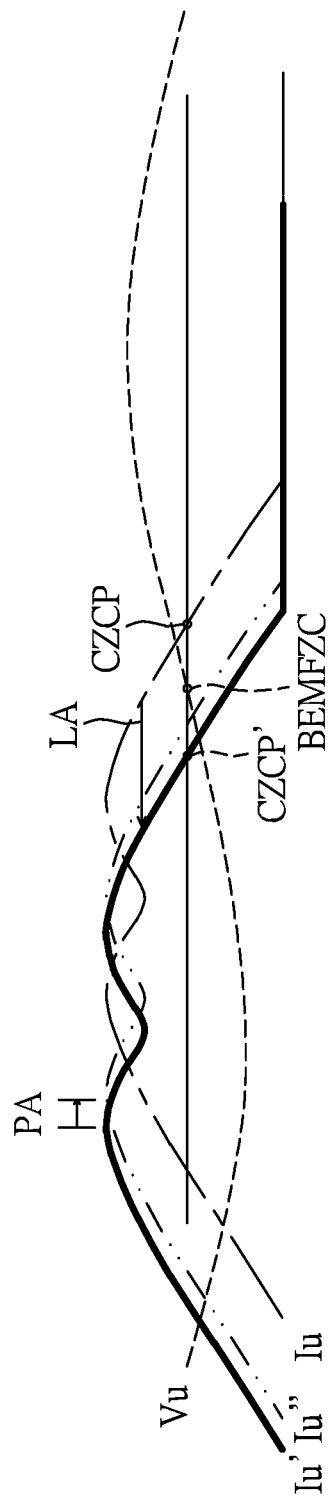
FIG. 2 is a signal timing diagram of a motor driving circuit according to an embodiment of the present disclosure.

Reference is made to FIG. 2, which is a signal timing diagram of a motor driving circuit according to an embodiment of the present disclosure. When the rotation speed is switched, the phase circuit U generates a phase current Iv. At this time, the generated back electromotive force signal Vu is as shown in the FIG. 2. It can be seen from FIG. 2 that a detected current zero-crossing point CZCP falls behind the BEMF zero point BEMFZC, causing errors to occur in the detected positions of the zero points of the BEMF signals Vu, Vv, and Vw. At this time, the rotation speed signal lookup module 17 is configured to query the lookup table 170 according to the current rotation speed, find a current lead angle LA corresponding to the current rotation speed from the lookup table 170 and generate the leading angle indication signal S6', for indicating the current lead angle LA, to be transmitted to the automatic leading angle controller 18. The automatic leading angle controller 18 controls the modulation signal generating circuit 19 through the phase adjusting signal S7 to roughly adjust the phase of the modulation waveform Su according to the current lead angle LA, and generates an adjusted phase current Iu' on the phase circuit U.

Next, the automatic lead angle controller 18 further receives the zero current signal S5 and the position reference signal S4 to generate another phase adjusting signal S7' based on a phase difference between the current zero-crossing point CZCP' of the phase currents Iu' and the BEMF zero point BEMFZC of the BEMF signals Vu.

For example, the automatic lead angle controller 18 can subtract a predetermined phase difference from the phase difference between the current zero-crossing point CZCP' and the BEMF zero point BEMFZC to generate the another phase adjusting signal S7' corresponding to a adjusting phase PA, and the another phase adjusting signal S7' is used for adjusting the phase difference between the current zero-crossing point CZCP' and the BEMF zero point BEMFZC to the predetermined phase difference.

Figure 3:
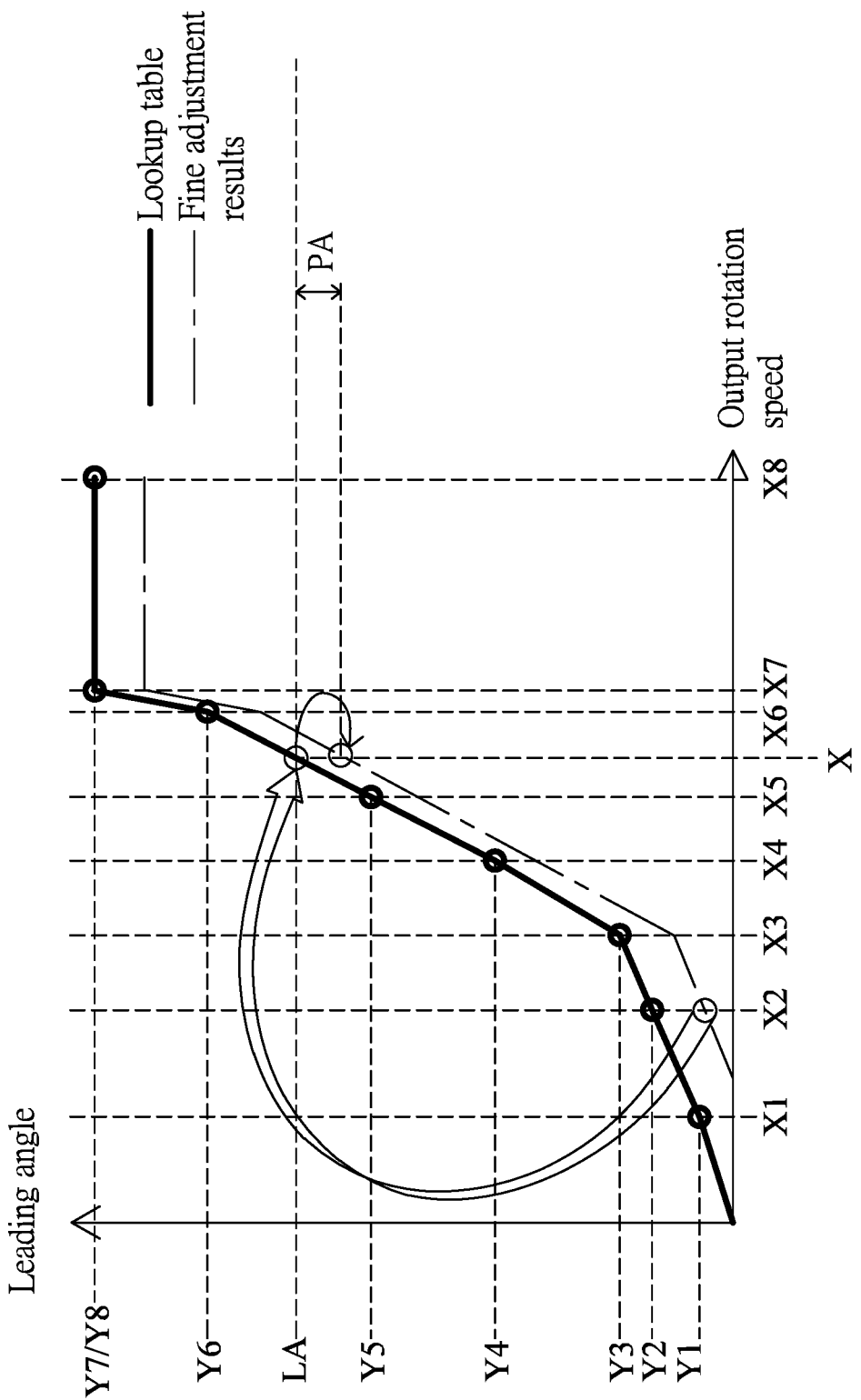
FIG. 3 is a plot diagram showing leading angles versus output rotation speeds according to the lookup table of the embodiment of the present disclosure.

Reference is made to FIG. 3, which is a plot diagram showing leading angles versus output rotation speeds according to the lookup table of the embodiment of the present disclosure, and FIG. 3 shows correspondences between a plurality of rotation speeds X1, X2, . . . and X8 and a plurality of lead angles Y1, Y2, . . . and Y8. As shown in FIG. 3, when the rotation speed X2 is adjusted to the current speed X, the speed signal lookup module 17 queries the lookup table 170 according to the current speed X, and finds the current lead angle LA corresponding to the current speed X from the lookup table 170, and perform a rough adjustment to generate the adjusted phase current Iu' on the phase circuit U.

Next, the automatic lead angle controller 18 further generate the another phase adjusting signal S7' based on the phase difference between the current zero-crossing point CZCP' of the phase currents Iu' and the BEMF zero point BEMFZC of the BEMF signals Vu to perform a fine adjustment on the phase current Iu', and a result of the fine adjustment is shown by broken line data in FIG. 3.

Figure 4:
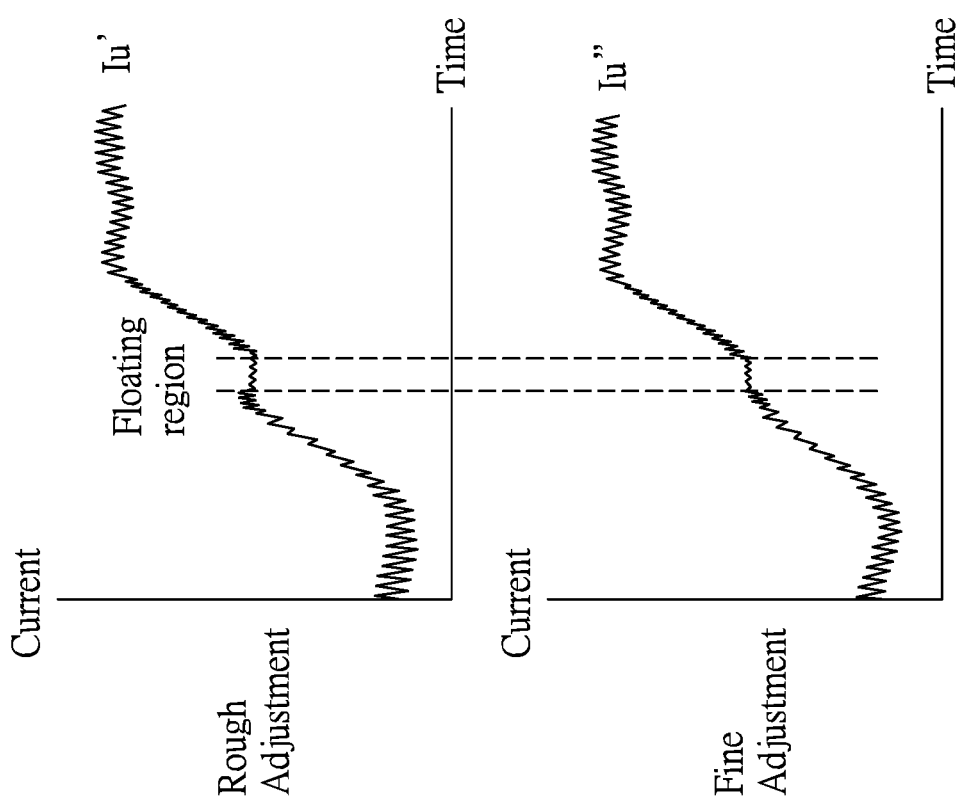
FIG. 4 is a partial enlarged view of a phase current according to an embodiment of the present disclosure.

Reference is made to FIG. 4, which is a partial enlarged view of a phase current according to an embodiment of the present disclosure. As shown in FIG. 4, after the rough adjustment is performed on the phase current Iu with the current lead angle LA, the adjusted phase current Iu' is generated, and it can be seen that a floating region, that is, the current discontinuous region, is already quite small. When the phase current Iu' is further finely adjusted by the adjusting the phase PA, the generated phase current Iu" can further reduce the floating region, thereby reducing switching noise.

Therefore, by utilizing the motor driving circuit provided by the present disclosure, when the switching speed is changed, the leading angle can be determined by querying the lookup table, and the modulation waveform is roughly adjusted by the leading angle to output the driving voltage in advance to make the phase current zero point appears early, and the leading angle is adjusted to approach a reasonable phase by detecting the phase difference between the phase current zero point and the BEMF zero point. Therefore, under a premise of achieving the position detection of a sensorless motor, it is ensured that the phase current does not cause errors to occur in the BEMF zero point detection when the BEMF zero point is measured, while effectively reducing the current discontinuous region, thereby reducing the noise.

Figure 5A:
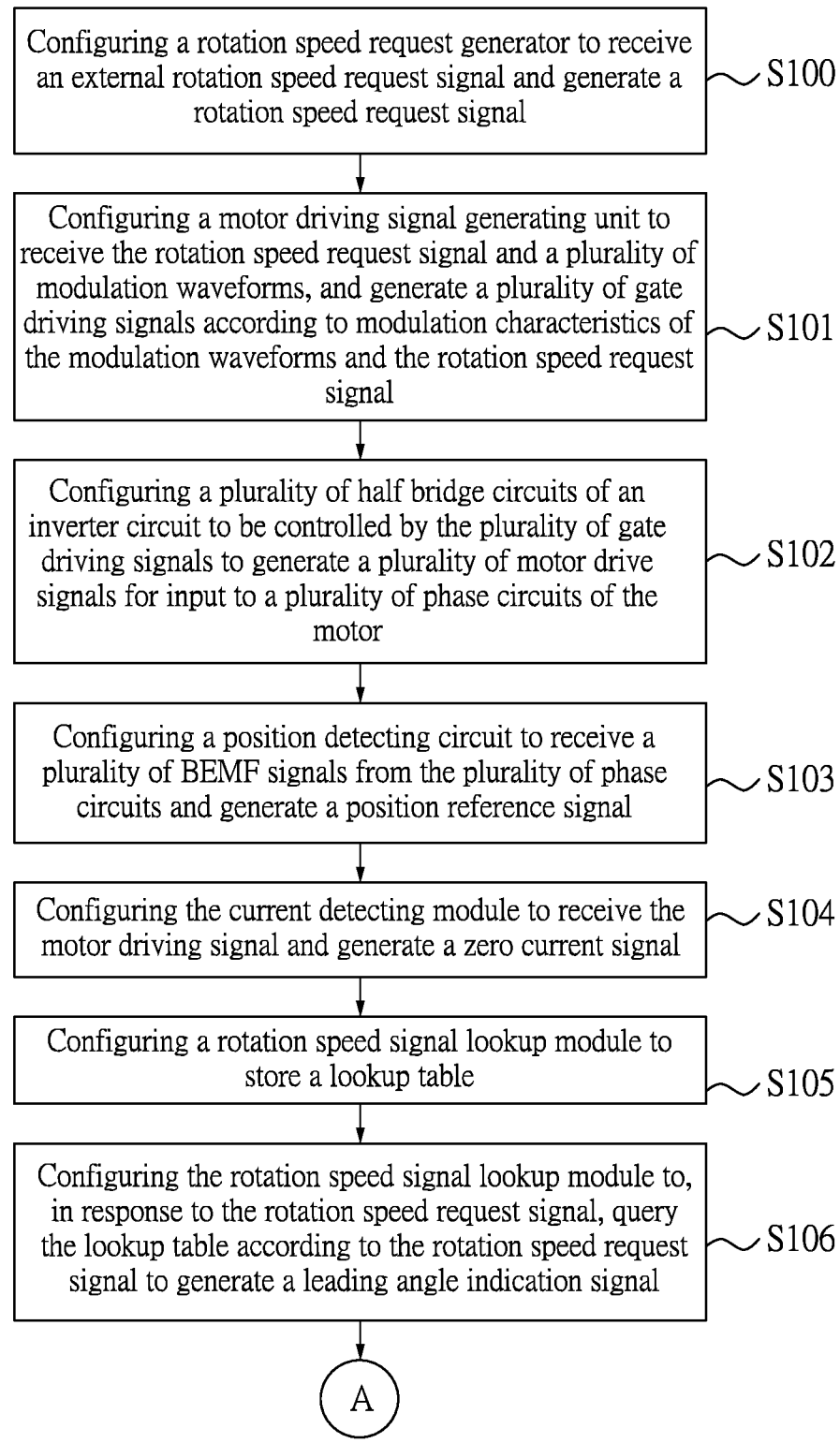
FIGS. 5A and 5B are flowcharts of a motor driving method according to an embodiment of the present disclosure.
Figure 5B:
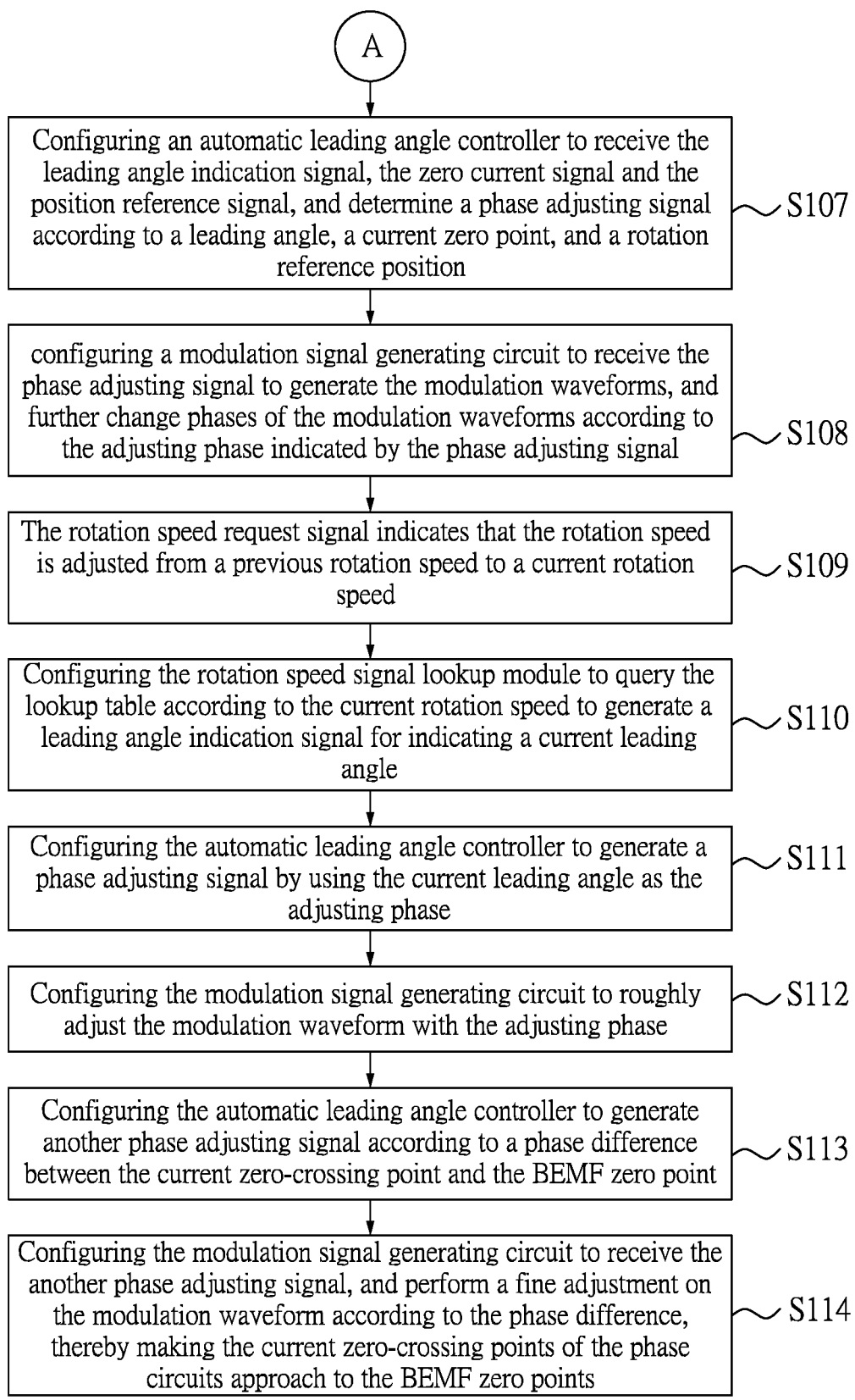

FIGS. 5A and 5B are flowcharts of a motor driving method according to an embodiment of the present disclosure. Reference is made to FIG. 5, an embodiment of the present disclosure provides a motor driving method, which is applicable to the motor driving circuit 1 in the foregoing embodiments, and includes at least the following steps:

Step S100: Configuring a rotation speed request generator to receive an external rotation speed request signal and generate a rotation speed request signal. The rotation speed request signal is used to indicate a rotation speed of the motor.

Step S101: Configuring a motor driving signal generating unit to receive the rotation speed request signal and a plurality of modulation waveforms, and generate a plurality of gate driving signals according to modulation characteristics of the modulation waveforms and the rotation speed request signal.

Step S102: Configuring a plurality of half bridge circuits of an inverter circuit to be controlled by the plurality of gate driving signals to generate a plurality of motor drive signals for input to a plurality of phase circuits of the motor.

Step S103: Configuring a position detecting circuit to receive a plurality of BEMF signals from the plurality of phase circuits and generate a position reference signal. The position reference signal is used to indicate a BEMF zero point of the motor.

Step S104: Configuring the current detecting module to receive the motor driving signal and generate a zero current signal. The zero current signal is used to indicate current zero-crossing points of the phase circuits.

Step S105: Configuring a rotation speed signal lookup module to store a lookup table. The lookup table defines correspondences between a plurality of rotation speeds and a plurality of leading angles.

Step S106: Configuring the rotation speed signal lookup module to, in response to the rotation speed request signal, query the lookup table according to the rotation speed request signal to generate a leading angle indication signal.

Step S107: Configuring an automatic leading angle controller to receive the leading angle indication signal, the zero current signal and the position reference signal, and determine a phase adjusting signal according to a leading angle, a current zero point, and a rotation reference position. The phase adjusting signal is used to indicate an adjusting phase.

Step S108: configuring a modulation signal generating circuit to receive the phase adjusting signal to generate the modulation waveforms, and further change phases of the modulation waveforms according to the adjusting phase indicated by the phase adjusting signal.

Step S109: The rotation speed request signal indicates that the rotation speed is adjusted from a previous rotation speed to a current rotation speed.

Step S110: Configuring the rotation speed signal lookup module to query the lookup table according to the current rotation speed to generate a leading angle indication signal for indicating a current leading angle.

Step S111: Configuring the automatic leading angle controller to generate a phase adjusting signal by using the current leading angle as the adjusting phase.

Step S112: Configuring the modulation signal generating circuit to roughly adjust the modulation waveform with the adjusting phase.

Step S113: Configuring the automatic leading angle controller to generate another phase adjusting signal according to a phase difference between the current zero-crossing point and the BEMF zero point.

Step S114: Configuring the modulation signal generating circuit to receive the another phase adjusting signal, and perform a fine adjustment on the modulation waveform according to the phase difference, thereby making the current zero-crossing points of the phase circuits near the BEMF zero points.

The motor driving method of the present disclosure includes operation modes of the respective components of the motor driving circuit in the foregoing embodiments, and thus will not be described herein.

In conclusion, the motor driving circuit and method provided by the present disclosure can determine the lead angle by querying the lookup table when the switching speed is changed, and roughly adjust the modulation waveform by the lead angle to output the driving voltage in advance, so as to make the phase current zero point appear earlier, and then the phase difference between the phase current zero point and the back electromotive force zero point is detected to adjust the lead angle to be close to a reasonable phase. Therefore, under a premise of satisfying the position detection of a sensorless motor, it is ensured that the phase current does not cause errors to occur in the BEMF zero point detection when the BEMF zero point is measured, while effectively reducing the current discontinuous region, thereby reducing the noise.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driving circuit for driving a motor, comprising:
a rotation speed request generator configured to receive an external rotation speed request signal and generate a rotation speed request signal for indicating a rotation speed of the motor;
a motor driving signal generating unit configured to receive the rotation speed request signal and a plurality of modulation waveforms, and generate a plurality of gate driving signals according to modulation characteristics of the modulation waveforms and the rotation speed request signal;
an inverter circuit including a plurality of half bridge circuits configured to be controlled by the plurality of gate driving signals to generate a plurality of motor drive signals for being input to a plurality of phase circuits of the motor;
a position detecting circuit configured to receive a plurality of back electromotive force (BEMF) signals from the plurality of phase circuits and generate a position reference signal for indicating a back electromotive force (BEMF) zero point of the motor;

a current detecting module configured to receive the motor driving signals and generate a zero current signal for indicating current zero-crossing points of the phase circuits;

a speed signal lookup table module configured to store a lookup table, wherein the lookup table defines correspondences between a plurality of rotation speeds and a plurality of leading angles, and wherein the rotation speed signal lookup module is configured to, in response to the rotation speed request signal, query the lookup table according to the rotation speed request signal to generate a leading angle indication signal;

an automatic leading angle controller receiving the leading angle indication signal, the zero current signal and the position reference signal, and configured to generate a phase adjusting signal for indicating an adjusting phase according to a leading angle indicated by the leading angle indication signal, a current zero point indicated by the zero current signal, and a rotation reference position indicated by the position reference signal; and a modulation signal generating circuit configured to receive the phase adjusting signal to generate the modulation waveforms, and further change phases of the modulation waveforms according to the adjusting phase indicated by the phase adjusting signal, wherein in response to the rotation speed request signal indicating that the rotation speed is adjusted from a previous rotation speed to a current rotation speed, the rotation speed signal lookup module is configured to query the lookup table according to the current rotation speed and generate the leading angle indication signal for indicating a current lead angle, the automatic leading angle controller is configured to generate the phase adjusting signal by using the current lead angle as the adjusting phase, and the modulation signal generating circuit is configured to perform a rough adjustment on the modulation waveforms by using the adjusting phase, and wherein the automatic leading angle controller further receives the zero current signal and the position reference signal to generate another phase adjusting signal according to a phase difference between the current zero-crossing point and the BEMF zero point, the modulation signal generating circuit receives the another phase adjusting signal, and performs a fine adjustment on the modulation waveforms according to the phase difference, thereby making the current zero-crossing point of the phase circuits near the BEMF zero point.

2. The motor driving circuit according to claim 1, wherein the motor driving signal generating unit includes:

a PWM generator configured to receive the rotation speed request signal and generate a plurality of PWM signals, wherein the PWM generator is further configured to receive the modulation waveforms to generate the PWM signals according to the modulation characteristics of the modulation waveforms; and a gate driving circuit, configured to receive the PWM signals and generate the gate driving signals.

3. The motor driving circuit according to claim 1, wherein the leading angles is generated by: driving the motor with the rotation speeds, respectively; and adjusting the plurality of leading angles to ensure that the current zero-crossing point occurs with a buffer phase difference being ahead of the BEMF zero point.

4. The motor driving circuit according to claim 1, wherein the current detecting module includes a comparator, which includes:

a first input for receiving a current of one of the phase circuits;

a second input for receiving a reference current;

an output for generating the zero current signal after the comparator performs an operation on the current and the reference current, wherein the zero current signal is used for indicating current zero-crossing points of the current.

5. The motor driving circuit according to claim 1, wherein the automatic leading angle controller further receives the zero current signal and the position reference signal to subtract a predetermined phase difference from the phase difference between the current zero-crossing point and the BEMF zero point to generate the another phase adjusting signal for adjusting the phase difference between the current zero-crossing point and the BEMF zero point to the predetermined phase difference.

6. A motor driving method, comprising the following steps:

configuring a rotation speed request generator to receive an external rotation speed request signal and generate a rotation speed request signal for indicating a rotation speed of the motor;

configuring a motor driving signal generating unit to receive the rotation speed request signal and a plurality of modulation waveforms, and generate a plurality of gate driving signals according to modulation characteristics of the modulation waveforms and the rotation speed request signal;

configuring a plurality of half bridge circuits of an inverter circuit to be controlled by the plurality of gate driving signals to generate a plurality of motor drive signals for being input to a plurality of phase circuits of the motor;

configuring a position detecting circuit to receive a plurality of back electromotive force (BEMF) signals from the plurality of phase circuits and generate a position reference signal for indicating a back electromotive force (BEMF) zero point of the motor;

configuring a current detecting module to receive the motor driving signals and generate a zero current signal for indicating current zero-crossing points of the phase circuits;

configuring a speed signal lookup table module to store a lookup table, wherein the lookup table defines correspondences between a plurality of rotation speeds and a plurality of leading angles;

configuring the rotation speed signal lookup module to, in response to the rotation speed request signal, query the lookup table according to the rotation speed request signal to generate a leading angle indication signal;

configuring an automatic leading angle controller to receive the leading angle indication signal, the zero current signal and the position reference signal, and determine a phase adjusting signal for indicating an adjusting phase according to a leading angle indicated by the leading angle indication signal, a current zero point indicated by the zero current signal, and a rotation reference position indicated by the position reference signal;

configuring a modulation signal generating circuit to receive the phase adjusting signal to generate the modulation waveforms, and further change phases of the modulation waveforms according to the adjusting phase indicated by the phase adjusting signal;

configuring, in response to the rotation speed request signal indicating that the rotation speed is adjusted from a previous rotation speed to a current rotation speed, the rotation speed signal lookup module to query the lookup table according to the current rotation speed and generate the leading angle indication signal for indicating a current leading angle;

configuring the automatic leading angle controller to generate the phase adjusting signal by using the current leading angle as the adjusting phase; configuring the modulation signal generating circuit to perform a rough adjustment on the modulation waveforms by using the adjusting phase;

configuring the automatic leading angle controller to receive the zero current signal and the position reference signal to generate another phase adjusting signal according to a phase difference between the current zero-crossing point and the BEMF zero point; and configuring the modulation signal generating circuit to receive the another phase adjusting signal, and perform a fine adjustment on the modulation waveforms according to the phase difference, thereby making the current zero-crossing point of the phase circuits close to the BEMF zero point.

7. The motor driving method according to claim 6, further comprising:

configuring a PWM generator of the motor driving signal generating unit to receive the rotation speed request signal to generate a plurality of PWM signals;

configuring the PWM generator to receive the modulation waveforms to generate the PWM signals according to the modulation characteristics of the modulation waveforms; and configuring a gate driving circuit to receive the PWM signals and generate the gate driving signals.

8. The motor driving method according to claim 6, further comprising:

configuring the motor to be driven by the motor with the plurality of rotation speeds in the lookup table; and adjusting the plurality of leading angles to ensure that the current zero-crossing point occurs with a buffer phase difference being ahead of the BEMF zero point, thereby obtaining the leading angles corresponding to the rotation speeds to establish the lookup table.

9. The motor driving method according to claim 6, further comprising:

configuring a first input of a comparator of the current detecting module to receive current of one of the phase circuits;

configuring a second input of the comparator to receive a reference current; and configuring the comparator to perform an operation on the current and the reference current and generate the zero current signal at an output of the comparator, wherein the zero current signal is used for indicating current zero-crossing points of the current.

10. The motor driving method according to claim 6, further comprising:

configuring the automatic leading angle controller to receive the zero current signal and the position reference signal to subtract a predetermined phase difference from the phase difference between the current zero-crossing point and the BEMF zero point to generate the another phase adjusting signal, wherein the another phase adjusting signal is used for adjusting the phase difference between the current zero-crossing point and the BEMF zero point to the predetermined phase difference.

* * * * *